Jan. 17, 1939.　　　G. McCORMICK　　　2,143,954

JOURNAL BOX

Filed April 5, 1937　　　3 Sheets-Sheet 1

INVENTOR.
George McCormick
BY
Booth & Booth
ATTORNEYS.

Jan. 17, 1939.　　　　　G. McCORMICK　　　　　2,143,954

JOURNAL BOX

Filed April 5, 1937　　　3 Sheets-Sheet 2

INVENTOR.
George McCormick
BY Booth & Booth
ATTORNEYS.

Jan. 17, 1939.  G. McCORMICK  2,143,954
JOURNAL BOX
Filed April 5, 1937   3 Sheets-Sheet 3

INVENTOR.
George McCormick
BY Booth & Booth
ATTORNEYS.

Patented Jan. 17, 1939

2,143,954

UNITED STATES PATENT OFFICE 2,143,954

JOURNAL BOX

George McCormick, Redwood City, Calif.

Application April 5, 1937, Serial No. 135,044

7 Claims. (Cl. 308—88)

The present invention relates to bearings for rotating shafts, and is especially adapted for the axle journals of railway cars and locomotives.

The principal object of the invention is to provide a journal box having a lubricator therein which is easily accessible for inspection and supply of additional lubricant, and which can be quickly removed, as a unit, for repair or replacement. Other objects of the invention are to provide means for preventing the escape of lubricant and the entrance of dust and dirt; to provide means for supplying the lubricant directly to the journal surface; and to provide means for retaining the lubricator unit in position in the box without impeding its ready removal therefrom.

These and other objects and advantages of the invention will become apparent from the following specification, which should be read with the understanding that the form, construction and arrangement of the several parts described and shown in the accompanying drawings can be varied, within the limits of the claims hereto appended, without departing from the spirit of the invention.

A preferred form of the invention is fully described herein with reference to the accompanying drawings in which Fig. 1 is a vertical longitudinal section of my improved journal box.

Figure 1:
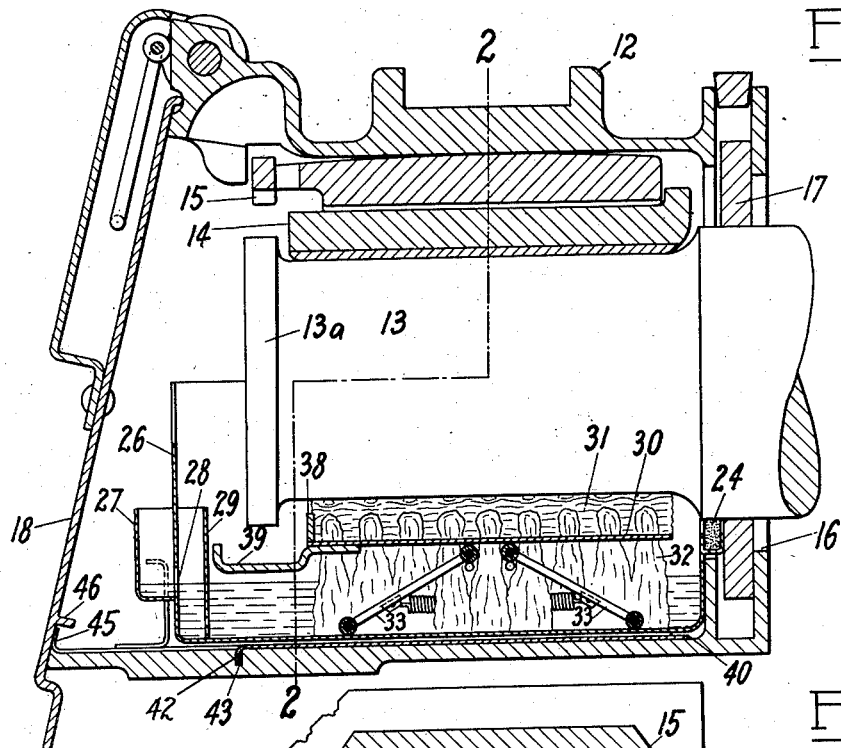

In the drawings, the reference numeral 12 designates a journal box surrounding the journal 13 of an axle. The bearing 14 and the wedge 15 are of standard construction and need not be further described. The rear end of the box is provided with an aperture 16 of larger diameter than the axle shaft, and an oil retainer 17 of any suitable form is provided to prevent loss of oil through said opening and the entrance of dust and dirt.

The front of the box is provided with an opening substantially equal in area to the interior of the box, which opening is closed by a hinged or otherwise removable cover plate 18. The lower portion of the box is rectangular in cross section and has a flat bottom 19 on which the lubricator unit rests.

Figure 4:
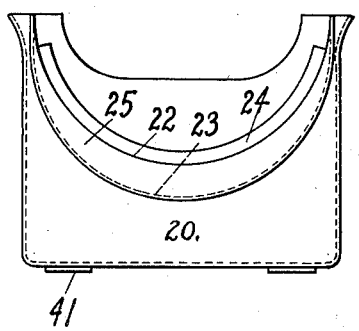
Figs. 3 and 4 are respectively a plan and rear end elevation of the oil container or cellar.
Figure 3:
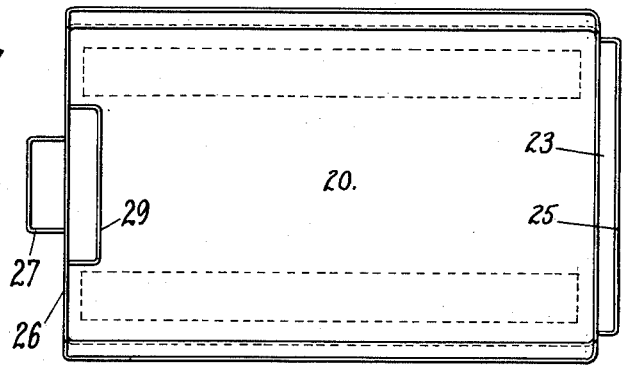

The lubricator unit comprises a rectangular metal oil container or cellar 20 having a flat bottom and upstanding sides and ends, the sides extending upwardly to approximately the middle of the axle and being flared outwardly at their upper edges to have free contact with the side walls of the box. In order to assist in preventing accidental displacement of the oil cellar 20, the side walls of the box may be provided with downwardly sloping ribs 21, Fig. 2, immediately above the upper edges of the sides of said cellar. The ribs 21 also deflect into the cellar any oil that may be thrown out by the rotating axle, and prevent it from running down the sides of the box outside the cellar. The rear end of the oil cellar 20 is cut out in semicircular form, as shown at 22 in Fig. 4, and is provided with a channel 23 in which is retained a semicircular felt oil retainer 24 bearing against the lower portion of the axle shaft to assist the retainer 17, Fig. 1, in preventing loss of oil and the entrance of dust and dirt. The channel 23 is formed by a flange 25 projecting from the rear end of the cellar and lying within the opening 16 of the box.

The front wall 26 of the cellar is carried up above the bottom of the axle, and is provided with an exterior oil inspection cup 27, which communicates with the interior of the cellar through an aperture 28 in the front wall. A splash plate 29 is provided inside the front wall 26 behind the aperture 28.

Figure 9:
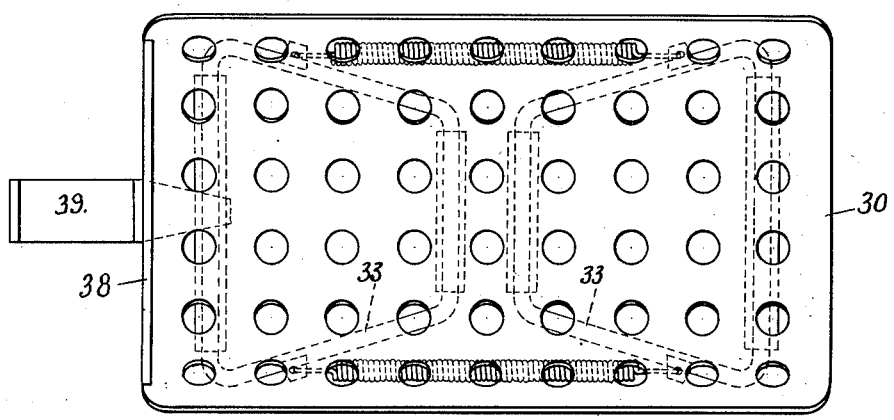
Figs. 9, 10 and 11 are respectively a plan, side elevation and front end elevation of the lubricator body and its resilient supporting means.
Figure 10:
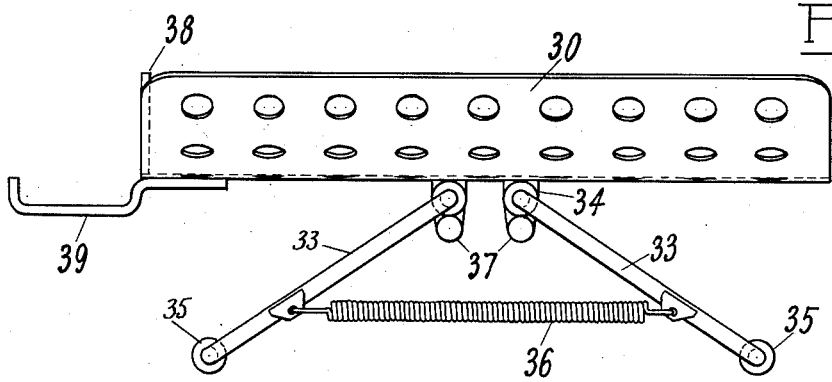
Figure 11:
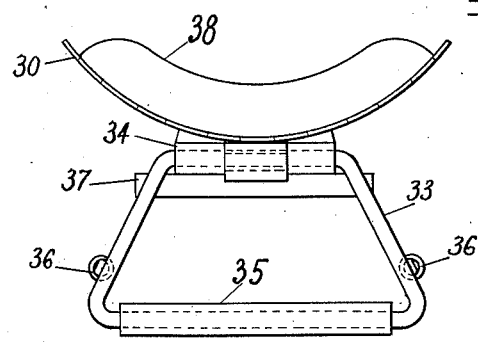

The body of the lubricator is a perforated metal plate 30 having a curvature approximately coaxial with the axle 13 and extending almost the full length of the journal. The plate 30 is spaced below the axle and carries a pad 31 of absorbent material. Wicks 32 having their upper ends embedded in the pad 31 extend down through holes in the plate 30 and conduct the oil from the cellar to said pad. The pad 31 is pressed upwardly against the journal surface by resilient supporting means interposed between the plate 30 and the bottom of the cellar 20. I prefer to make these supports as shown in Figs. 9, 10 and 11 as a pair of loops or bails 33 having their upper cross members rotatably mounted in tubes 34 secured to the bottom of the plate 30 near its center. The bails 33 are inclined outwardly and downwardly, and their lower cross members are provided with tubular rollers 35 which rest and roll upon the flat bottom of the cellar 20. Springs 36 draw the lower ends of the bails 33 together, thereby elevating the plate 30 and pressing the pad against the journal surface. Transverse rods 37 are secured to the bottom of the hinged tubes 34 and engage the legs of the bails to limit their movement toward each other. The front end of the plate 30 is provided with an upstanding flange 38 to retain the end of the pad 31 and prevent wear of the pad by the collar 13a of the journal 13. An arm 39 extends forwardly from the plate and is used as a handle for adjusting the lubricator and for manipulating it in removing and replacing it as described hereinafter.

Figure 6:
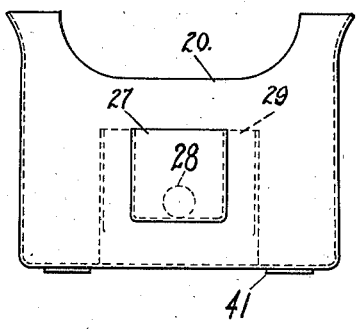
Figs. 5 and 6 are respectively a side elevation, and front end elevation of the oil cellar.
Figure 5:
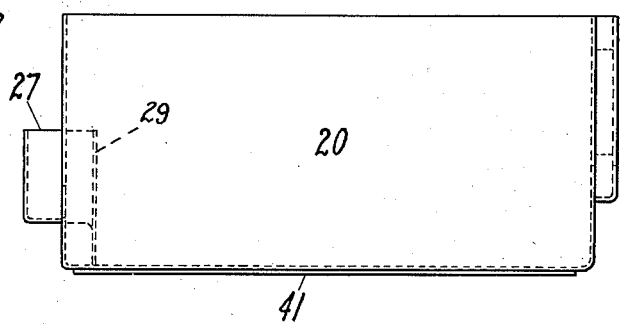
Figures 7, 8:
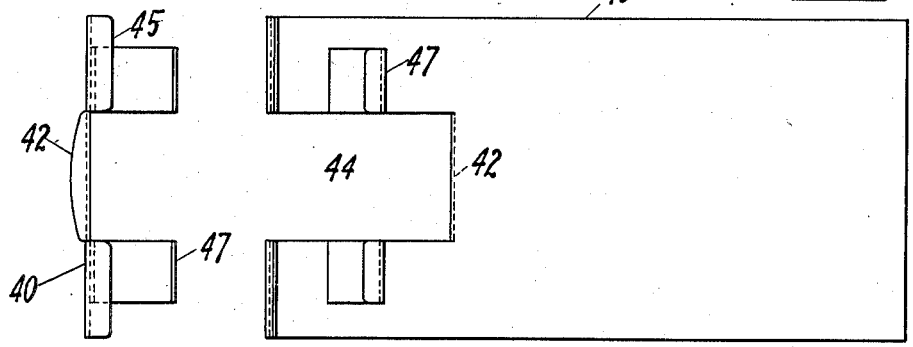
Figs. 7 and 8 are respectively a plan and front end elevation of the locking plate for retaining the lubricator unit in the box.

A locking or retaining plate 40 is interposed between the bottom of the oil cellar 20 and the bottom of the box, and may either be attached to said cellar, or preferably as shown in Figs. 1, 2, 7 and 8, separate from it. When said locking plate is separate, the bottom of the cellar is preferably provided with a pair of spaced wear plates 41, Figs. 5 and 6. The locking plate 40 has a downwardly projecting transverse flange 42 which engages a groove 43 cut in the bottom of the box. I prefer to form the front end of the plate 40 with a notch 44, the base of said notch being turned downwardly to form the flange 42. The remaining side portions of the plate are extended forwardly in front of the box and are each provided with an upturned terminal flange 45. The cover 18 of the box is provided with an interior lug 46 which rests immediately above the flanges 45 when the cover is closed to prevent accidental lifting of the plate 40. The forward end portion of said plate is provided with upstanding lugs 47 positioned immediately in front of the front wall 26 of the oil cellar at either side of the inspection cup. If the cover 18 is provided with means of its own for locking it in closed position, the flange 42 and groove 43 may be omitted, the cover 18 being relied upon to hold the plate 40 and cellar 20 in position.

Figure 2:
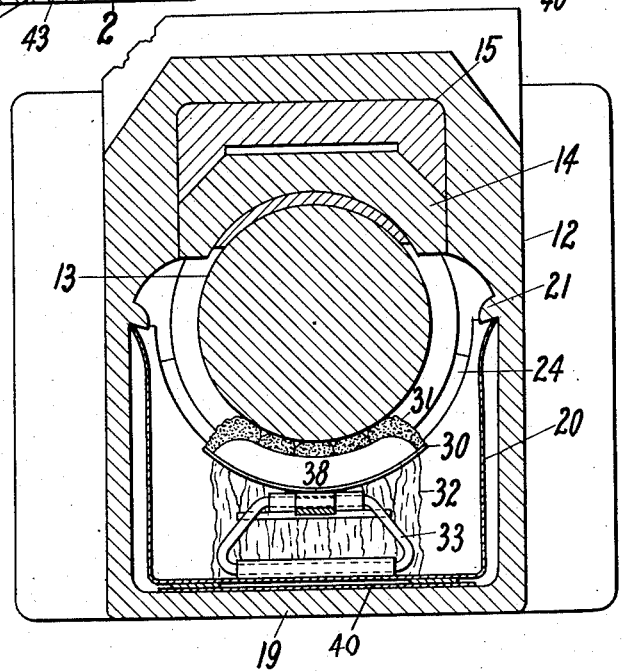
Fig. 2 is a transverse section taken on the line 2—2 of Fig. 1.

It will now be seen, especially by reference to Fig. 1, that in order to remove the lubricator unit from the box, it is necessary first to open the cover 18, then to lift the front end of the locking plate 40 to free its flange 42 from the groove 43, whereupon said locking plate and oil cellar 20 can be drawn out through the open front end of the box. It is also necessary to lower the lubricator body 30 and pad 31 by pressing down on the forward extension 39 to enable said pad to clear the flange 13a on the forward end of the journal. When the cover 18 is closed the forward portion of the locking plate 40 cannot be raised because of the lugs 46 of said cover. The lubricator is therefore securely locked in position as a unit. It can, however, be easily withdrawn from the box for repair or replacement after the cover 18 is opened.

The oil is contained within the cellar 20, whose side and front walls are carried up high enough to prevent loss of oil by splashing. Loss of oil rearwardly along the axle is prevented by the felt retainer 24. The cellar 20 can be easily filled through the space between its front wall 26 and the end of the axle, and the level of the oil within it can be seen in the inspection cup 27. The oil in the cellar is conveyed directly to the journal surface by the wicks 32 and the pad 31.

I claim:

1. In a railway axle journal, an oil container having a flat bottom positioned beneath the axle, a lubricator within said container comprising a rigid perforate plate spaced below the journal surface, an absorbent pad carried by said plate, wicks extending downwardly from said pad into the oil within said container, a pair of bails pivoted to said plate and inclined downwardly therefrom, said bails having straight horizontal lower members, tubular rollers surrounding said lower members and positioned to roll upon the flat bottom of said container, and a spring resiliently connecting said bails together in such a manner as to cause them to press said plate upwardly to maintain contact between said pad and the journal surface.

2. In a railway axle journal, an oil container having a flat bottom positioned beneath the axle, a lubricator within said container comprising a rigid perforate plate spaced below the journal surface, an absorbent pad carried by said plate, wicks extending downwardly from said pad into the oil within said container, a pair of bails having horizontal upper and lower members and outwardly and downwardly inclined side members, a pair of horizontal tubes secured to the under surface of said plate near its center, the upper members of said bails being pivotally mounted in said tubes, a bar secured to each of said tubes, the ends of said bars extending outwardly and forming stops engaging the side members of said bails to limit their approaching movement, rollers carried by the lower members of said bails in contact with the bottom of the container, and a spring interconnecting said bails, said spring moving said bails toward each other to elevate said plate and maintain contact between said pad and the journal surface.

3. In a railway axle journal, a box, a locking member slidably resting upon the bottom of said box, a removable oil container resting upon said member, means on said member for engaging the box and said container to prevent accidental removal of the latter, a lubricator positioned within said container and removable therewith, comprising a rigid perforate plate spaced below the journal surface, an absorbent pad carried by said plate, wicks extending downwardly from said pad into the oil within said container, a pair of bails pivoted to said plate and inclined downwardly therefrom, rollers carried by the lower portions of said bails to travel upon the bottom of the container, and spring means acting upon said bails in such a manner as to cause them to force said plate upwardly to maintain contact between said pad and the journal surface.

4. In a railway axle journal, a box having an open end, a removable cover for said end, an oil container positioned beneath the axle and removable through the open end of the box, a locking member engaging said container and a portion of the box, said member being movable to release said engagement, means carried by said cover for preventing the releasing movement of said locking member when the cover is closed, a lubricator positioned within said container and removable therewith, comprising a rigid perforate plate spaced below the journal surface, an absorbent pad carried by said plate, wicks extending downwardly from said pad into the oil within said container, a pair of bails pivoted to said plate and inclined downwardly therefrom, rollers carried by the lower portions of said bails to travel upon the bottom of the container, and spring means acting upon said bails in such a manner as to cause them to force said plate upwardly to maintain contact between said pad and the journal surface.

5. In a railway axle journal, a box having an open end and a recess in its bottom, a hinged cover for said open end, said cover having a projection from its inner surface, an oil container positioned beneath the axle within said box and removable through said open end, said container having a bottom and upstanding sides to retain a body of liquid therein, means in said container for conveying oil to the journal surface, a locking plate positioned between the bottom of said container and the bottom of the box and contiguous to both, an upwardly extending projection on said plate engaging said container, a downwardly extending projection on said plate engaging the recess in the bottom of the box, said projections preventing endwise removal of said container and said plate without initial elevation of said plate, and means on said plate engaged by the projection on said cover to prevent elevation of said plate when said cover is closed.

6. In a railway axle journal, a box having an open end and a recess in its bottom, an oil container positioned beneath the axle within said box and removable through said open end, said container having a bottom and upstanding sides to retain a body of liquid therein, means in said container for conveying oil to the journal surface, a locking plate positioned between the bottom of said container and the bottom of the box and contiguous to both, an upwardly extending projection on said plate engaging said container, and a downwardly extending projection on said plate engaging the recess in the bottom of the box, said projections preventing endwise removal of said container and said plate without initial elevation of said plate.

7. In a railway axle journal, a box having an open end, a hinged cover for said open end, an oil container rigidly mounted beneath the axle within said box and removable through said open end, said container having a bottom and upstanding sides to retain a body of liquid therein, means in said container for conveying oil to the journal surface, a removable locking member having engagement with a portion of the box and with said container to prevent removal of said container, and said cover having engagement with said locking member to prevent movement thereof when said cover is closed.

GEORGE McCORMICK.